No. 734,510. PATENTED JULY 28, 1903.
A. CAMERON.
WELL MACHINE.
APPLICATION FILED NOV. 5, 1901.
NO MODEL. 3 SHEETS—SHEET 1.
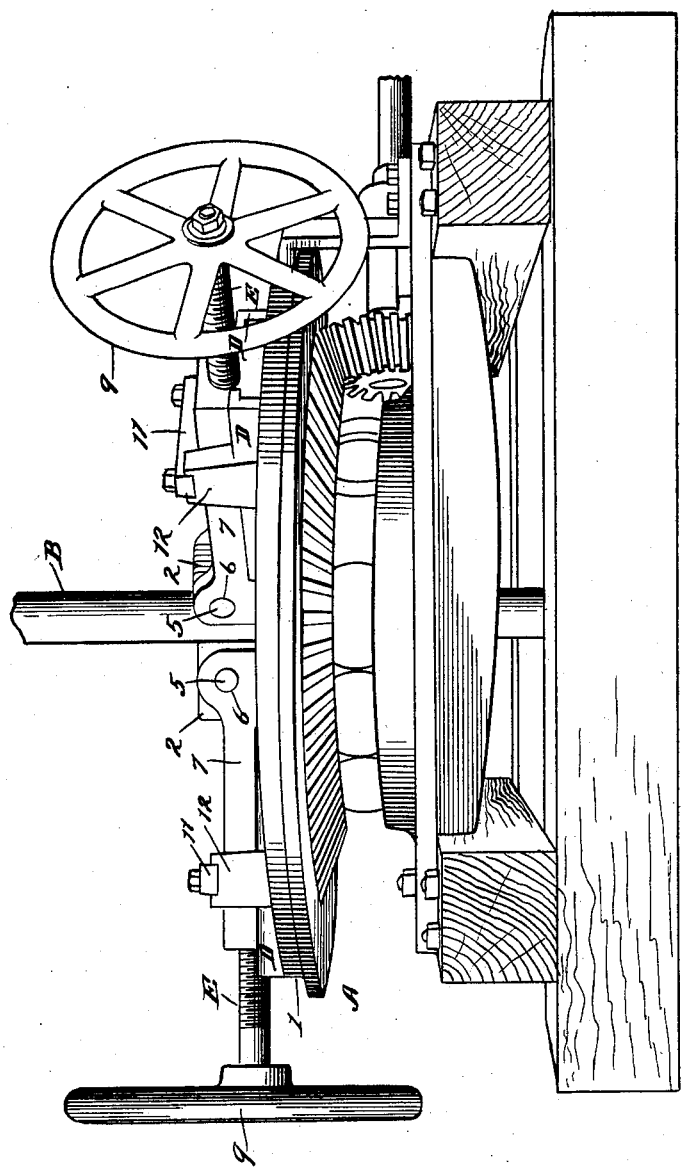
Witnesses,
Inventor,
Arthur Cameron
by Chas. G. Page
Atty No. 734,510. PATENTED JULY 28, 1903.
A. CAMERON.
WELL MACHINE.
APPLICATION FILED NOV. 5, 1901.
NO MODEL. 3 SHEETS—SHEET 2.
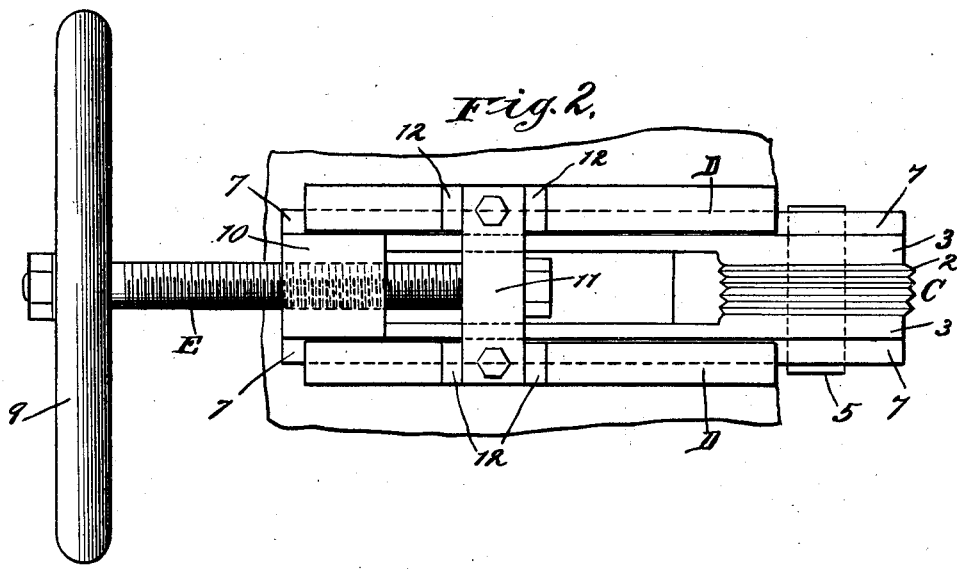
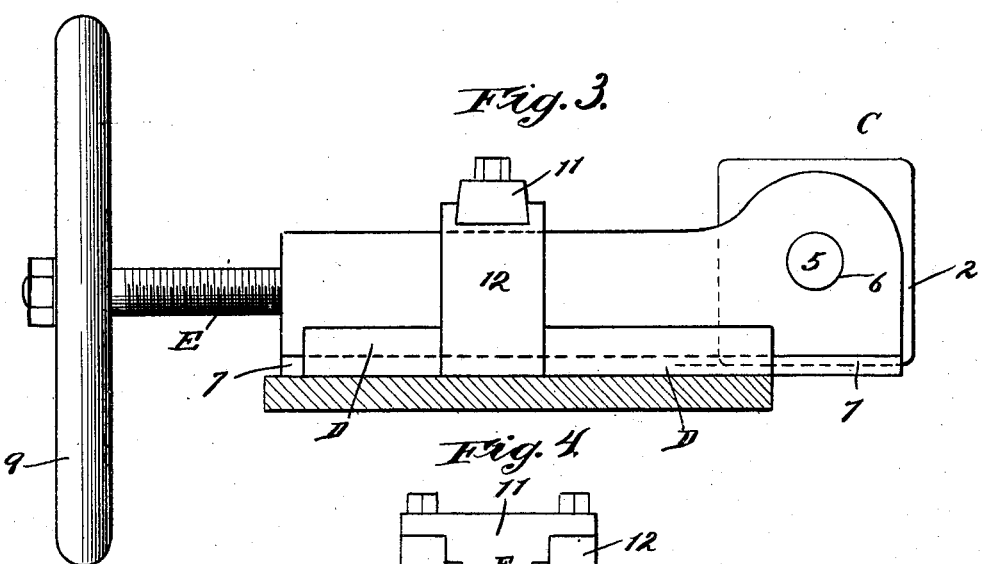
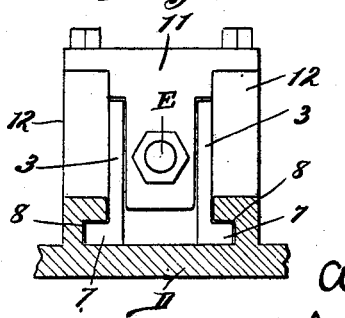
Witnesses
T. S. Mann
Ira D. Perry
Inventor,
Arthur Cameron
by Chas. G. Page
Attorney.

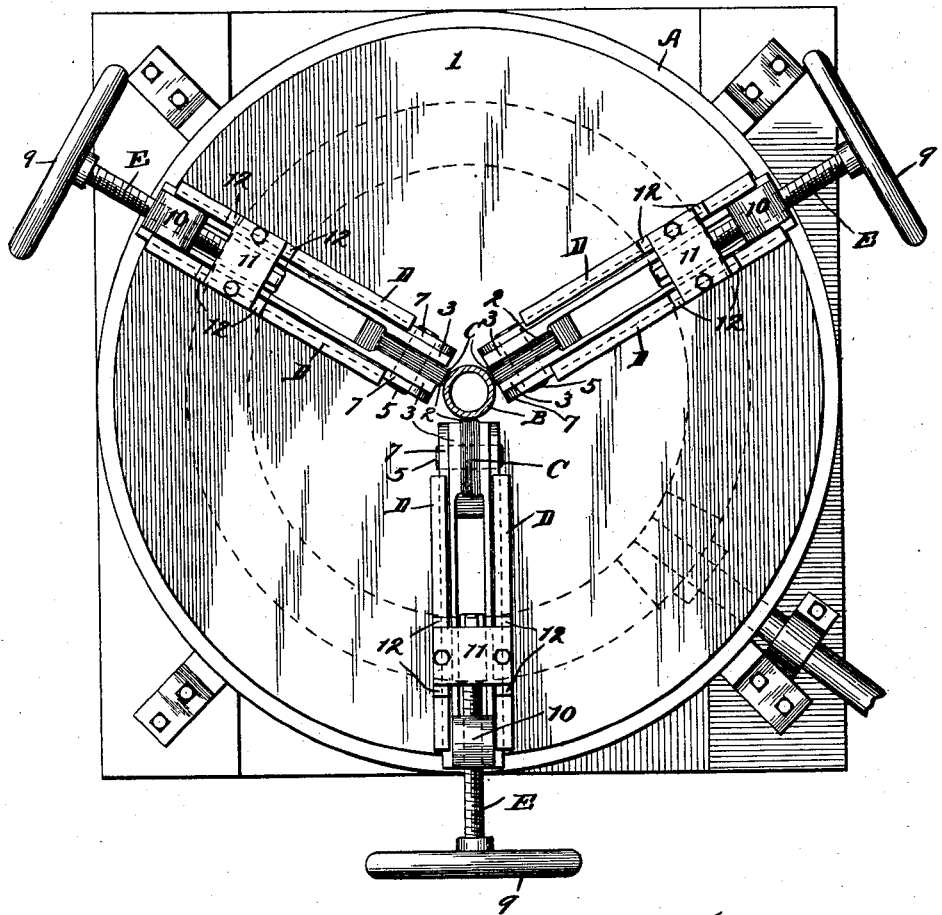

No. 734,510.

Patented July 28, 1903.

UNITED STATES PATENT OFFICE.

ARTHUR CAMERON, OF CHICAGO, ILLINOIS, ASSIGNOR TO FREDERICK C. AUSTIN, OF CHICAGO, ILLINOIS.

WELL-MACHINE.

SPECIFICATION forming part of Letters Patent No. 734,510, dated July 28, 1903.

Application filed November 5, 1901. Serial No. 81,165. (No model.)

*To all whom it may concern:*

Be it known that I, ARTHUR CAMERON, a citizen of the United States, residing at Chicago, in the county of Cook and State of Illinois, have invented a certain new and useful Improvement in Well-Machines, of which the following is a specification.

My invention relates to well-machines involving clutch devices arranged upon rotary supports and adapted for gripping and revolving a pipe or well-tube which during such operation descends and sinks into the earth. Prior to my invention such clutches in some cases have been adapted to rigidly grip the well-tube and while revolving about the axis of such tube, so as to rotate the latter, to descend with the same. With such arrangement a descent of determinate extent on the part of the clutch has necessitated freeing the clutch from the well-tube and then raising the clutch, so as to permit it to again engage the well-tube at a higher point. Another adopted expedient has been a clutch mounted upon a turn-table and composed of idler-rolls having circular transversely-angular gripping edges which engage the well-tube.

Objects of my invention are to avoid the objectionable feature of causing the clutch to successively engage and release the pipe, to avoid the frequent breaking away of the angular gripping edges in clutches employing rolls which of course only permit a limited extent of angular edge to engage the tube at any one time, to provide for a greater extent of gripping edges at all times engaging the well-tube and at the same time permitting the pipe to descend by gravity and while thus descending to slide between the jaws, and to provide a well-pipe-gripping device which while firmly gripping and revolving a descending well-pipe will yield to any tilt or vibration of the pipe, and thereby avoid breakage of the device employed for rotating and permitting the descent of the pipe into the earth.

Where the well-tube is being sunk through soft or alluvial deposits and is being revolved, it frequently happens that the pipe or tube will suddenly encounter hard strata of rock or other substance, and as the lower end of the pipe is shod with a cutting device its engagement with such hard strata will instantly oppose the rotation of the pipe, and where the clutch is provided with idler-rolls having circular angular gripping edges engaging the pipe the sudden opposition to the rotation of the pipe frequently causes the comparatively small portions of the angular gripping edges which are in engagement with the pipe to break off, thereby impairing the efficiency of the clutch. My invention, however, contemplates forming the jaws with angular gripping edges capable of engaging the pipe to a much greater extent along the lines parallel with the axis of the pipe, whereby the gripping portion of the jaws are rendered much stronger and are better adapted to resist breakage.

A further object is to prolong the extent of gripping engagement between the jaws and the pipe, whereby laterally cutting the pipe is avoided when some opposition is offered to its rotation, and at the same time permitting the pipe to descend by gravity between the jaws, which grip it and which cause it to revolve about its axis.

In the accompanying drawings, Figure 1 represents in perspective a portion of a well-machine embodying my invention. Fig. 2 is a top plan view of one of the clutch members on a larger scale. Fig. 3 shows the preceding figure in side elevation with the base-plate in section. Fig. 4 is an end elevation of Fig. 3 with the jaw removed and the base-plate shown in cross-section. Fig. 5 is a top plan view of the turn-table and clutch device. Fig. 6 shows one of the jaws in perspective. Fig. 7 illustrates a modified form and arrangement of the jaw.

The turn-table mainly comprises a rotary gear A, having a central opening for the passage of the well-pipe B and provided with a top plate 1.

The clutch device illustrated comprises three members which are arranged upon the turn-table, as best illustrated in Fig. 5. These clutch members are provided with jaws C, composed of hard steel blocks having one or more gripping-faces, according to the form of the block. Where the block is rectangular, as in Fig. 6, it may have four gripping-faces, of which, however, but one can engage the pipe at any one time. These gripping-faces are formed with sharp angular projecting portions adapted to cut into the pipe when the jaw is suitably pressed against the same. These gripping-faces 2 are each desirably formed by a series of parallel corrugations or V-shaped grooves adapted to provide a series of serrations or cutting edges which can cut into the pipe. The devices for holding and adjusting these jaws can be varied. The form shown comprises a jaw-holder 3, arranged to slide along a line radial to the pipe and having one of its ends bifurcated or recessed, so as to form a space in which the jaw C can be fitted. The jaw C has a central opening 4, and when thus fitted in said holder the jaw is held in place by a bolt or pin 5, which is inserted through suitable opening 6 in the sides of the holder and through the opening 4 in the jaw. The holder 3 has a flanged base 7, arranged to fit and slide in grooved ways 8, Fig. 4, formed in a base-plate D. As a means for adjusting the holder a screw-rod E, having a hand-wheel 9, passes through a threaded opening in a bearing 10, Fig. 2, which is rigid with the holder, which said screw-rod has also a swivel connection with a second bearing 11, bolted to blocks or uprights 12, arranged to rise from the base-plate D. By turning the hand-wheel the holder 3 can therefore be adjusted toward and from a pipe extending up through the opening in the turn-table.

The jaw C can be rounded at the corners; but each gripping-face of such jaw is what may be termed a substantially "flat" or "straight" gripping-face in contradistinction to the circular gripping-face of an idler-roll. The jaw C can be formed with only one gripping-face; but as a matter of further improvement I provide it with a plurality of gripping-faces, so that when one gripping-face becomes worn by constant use the jaw can be adjusted so as to present another gripping-face to the well-pipe. Owing to the form of the gripping-face of this jaw, the latter, even if mounted upon the pin 5 so as to turn thereon, will not and manifestly cannot so turn when the gripping-face of the jaw is in engagement with the well-pipe; but by permitting the jaw to oscillate about the axis of the pin 5 the jaw will, as a matter of further improvement, adapt itself to any slight tilt or deviation from the vertical which the well-pipe may assume. By such arrangement I provide a gripping block or jaw which can be adjusted radially to the well-pipe by adjusting a holder which, broadly considered, forms an adjustable abutment arranged to practically back the gripping jaw or block when the latter is in engagement with the well-pipe. The gripping block or jaw thus backed by an unyielding abutment is pivotally or hinge supported, and while the principal advantage of such arrangement is the adaptation of the gripping block or jaw to rock or tilt in conformity with any tilt on the part of the well-pipe, and thereby prevent the lateral pressure of a pipe of many tons in weight from breaking the clutch device, such adaptation on the part of the jaw to tilt also permits it to accommodate itself to any tilt on the part of the abutment—as, for example, where the turn-table which carries the abutments sags in operation or is not set on a perfectly horizontal plane. With reference to this portion of my invention, therefore, the gripping block or jaw may have any desired form of gripping-face provided with a plurality of sharp angles or projections which can be pressed into the pipe so as to take a suitable bite therein. The straight cutting edges of the jaw are adapted to cut into the well-pipe to an extent to cause the rotation of such pipe when the turn-table is revolved. These cutting edges, however, being in parallel vertical lines when thus engaging the pipe permit the latter, by reason of its great weight, to steadily slide down between the gripping-jaws. The cutting edges of the jaws are preferably formed by V-shaped grooves, which are so made as to depth that the cutting edges, regardless of pressure, cannot cut through the well-pipe.

Fig. 7 illustrates the holder having its end 13 provided with a dovetail recess 14, in which the corresponding back of a jaw C' can be fitted. This jaw C' has a serrated face 15 corresponding with any one of the serrated faces of the jaw C.

What I claim as my invention is—

1. In a well-machine a turn-table having a central opening for the well-pipe; and a clutch device for rotating the pipe arranged upon the turn-table and constructed with oppositely-arranged pipe-gripping jaws which are non-revoluble when in engagement with the pipe and which have cutting edges formed in planes coincident or parallel with the axis of the pipe and adapted to cut therein and at the same time permit the pipe to slide downwardly when thus engaged; and means for adjusting the jaws radially to the axis of the pipe.

2. In a well-machine a turn-table having a central opening for the well-pipe; and a clutch device for rotating the pipe arranged upon the turn-table and constructed with oppositely-arranged pipe-gripping jaws each having a plurality of faces formed with parallel cutting edges for engaging in the pipe, and means for adjusting the jaws radially to the axis of the pipe, the said cutting edges being formed in planes coincident or parallel with such axis of the pipe.

3. In a well-machine a turn-table having a central opening for the well-pipe; gripping blocks or jaws hinged or pivoted so as to tilt and adapted to engage the well-pipe; and abutments supported upon the turn-table and adjustable radially to the central opening therein; the gripping blocks or jaws being backed by said abutments and maintained by the same in gripping engagement with the well-pipe.

4. In a well-machine a turn-table having a central opening for the well-pipe; and a clutch device for rotating the pipe arranged upon the turn-table and involving a gripping-jaw having a face composed of cutting edges substantially parallel with the axis of the pipe, said jaw being arranged to rock so as to tilt its face in conformity with a tilt on the part of the pipe.

5. In a well-machine a turn-table having a central opening for the well-pipe; and a clutch device supported upon the turn-table and adapted and arranged for gripping and rotating the pipe and involving a jaw-holder which is adjustable radially to a pipe extending through the opening in the turn-table, and a jaw held by said jaw-holder and comprising a block C having serrated faces 2.

6. In a well-machine, a turn-table having a central opening for the well-pipe; and a clutch device for rotating and permitting longitudinal movement on the part of the pipe, and constructed with a tilting jaw supported for adjustment radial to the pipe and having a gripping-face formed by straight edges adapted to cut tracks in the well-pipe which is gripped and revolved by the clutch and at the same time permitted to descend by gravity.

ARTHUR CAMERON.

Witnesses:
CHARLES G. PAGE,
O. C. FREIBERG.